United States Patent [19]

Wicklund et al.

[11] Patent Number: 4,935,922
[45] Date of Patent: Jun. 19, 1990

[54] PACKET DATA SWITCH FOR TRANSFERRING DATA PACKETS FROM ONE OR A PLURALITY OF INCOMING DATA LINKS TO ONE OR A PLURALITY OF OUTGOING DATA LINKS

[75] Inventors: Rolf G. Wicklund, Sollentuna; Nils K. Jan Rooth, Trångsund, both of Sweden

[73] Assignee: Telefonaktiebolaget L M Ericsson, Stockholm, Sweden

[21] Appl. No.: 322,938

[22] Filed: Mar. 15, 1989

[30] Foreign Application Priority Data

Mar. 30, 1988 [SE] Sweden .............................. 8801183

[51] Int. Cl.$^5$ .............................................. H04Q 11/04
[52] U.S. Cl. ...................................................... 370/60
[58] Field of Search .............................. 370/60, 94, 61; 178/2 C

[56] References Cited

U.S. PATENT DOCUMENTS

| | | | |
|---|---|---|---|
| 4,081,612 | 3/1978 | Hafner | 178/2 C |
| 4,623,996 | 11/1986 | McMillen | 370/60 |
| 4,651,318 | 3/1987 | Luderer | 370/60 |
| 4,754,451 | 6/1988 | Eng et al. | 370/60 |

Primary Examiner—Douglas W. Olms
Assistant Examiner—Wellington Chin
Attorney, Agent, or Firm—Burns, Doane, Swecker & Mathis

[57] ABSTRACT

A packet data switch for transferring data packets including an address part and an information part from one of a plurality of incoming data links (10,30,50) to one or more outgoing data links (22, 42, 62) and supplying new address information for each data packet on the outgoing links. The selector includes a separate memory means (e.g. 13) for each incoming data link (10, 30, 50) and a separate memory means (e.g. 20) for each outgoing data link (22, 42, 62). The memory means assigned to the incoming data links send control signals for selective writing of a data packet into one or more buffer registers (e.g. 19) which are each assigned to an outgoing link (e.g. 22). The memory means assigned to the outgoing links supply the new address information for the data packets to the outgoing links.

2 Claims, 1 Drawing Sheet

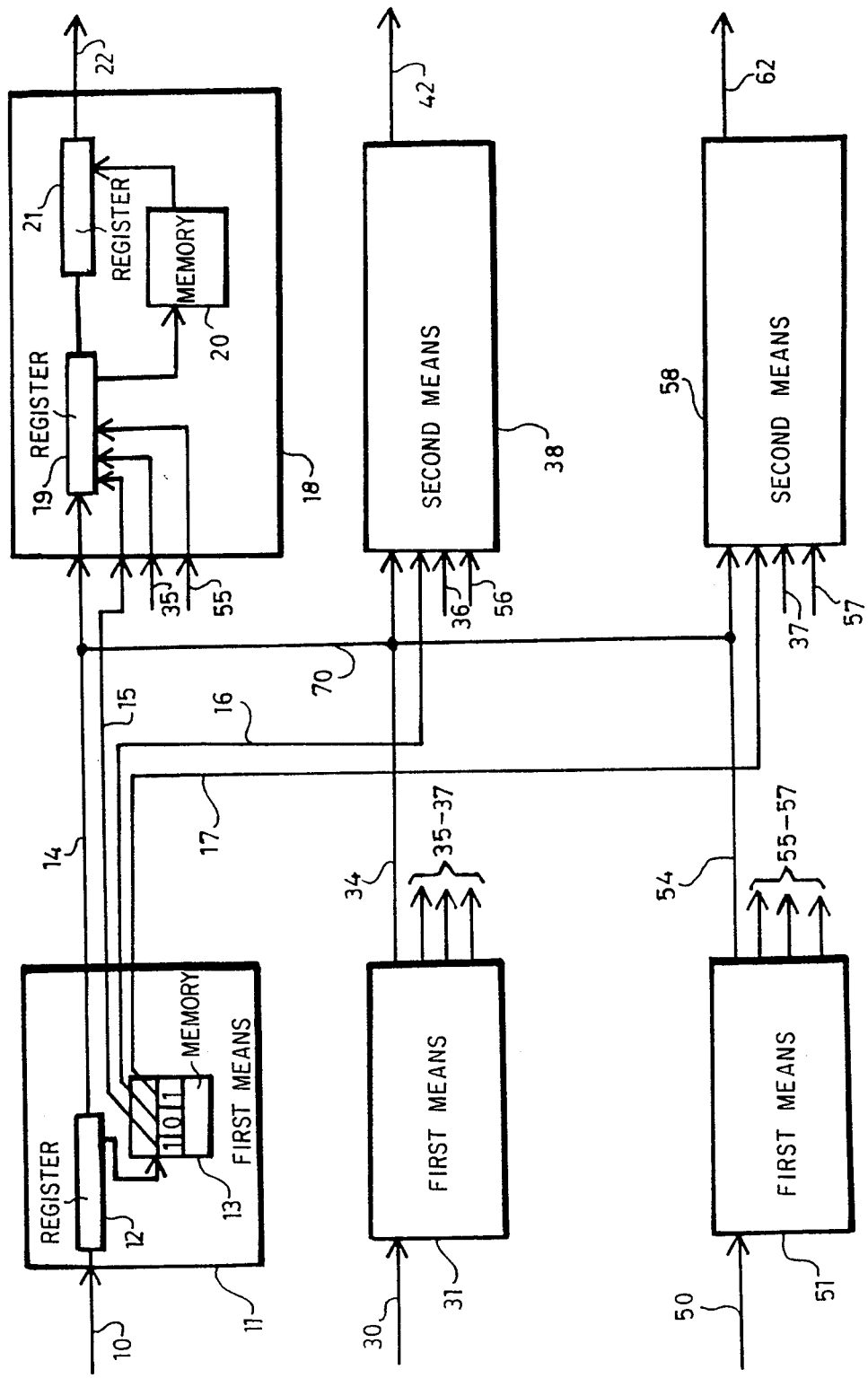

PACKET DATA SWITCH FOR TRANSFERRING DATA PACKETS FROM ONE OR A PLURALITY OF INCOMING DATA LINKS TO ONE OR A PLURALITY OF OUTGOING DATA LINKS

TECHNICAL FIELD

The invention relates to a packet data switch for transferring data packets including an address part and an information part from one of a plurality of incoming data links to one or a plurality of outgoing data links and supplying new address information intended for the data packets on the outgoing data links.

BACKGROUND ART

Previously proposed packet data switches would appear to be burdened with one or more of the disadvantages set forth below.

It has been a problem with transferring a data packet from an incoming data link to several outgoing data links, so-called broadcasting or multicasting. In certain cases this has only been achieved using relatively complicated special arrangements, e.g. so-called copying networks for copying data packets. It has not always been possible to assign a data packet different channel numbers on different outgoing data links when a data packet is transferred to several outgoing data links. However, it is an advantage if it is possible to assign such a data packet different channel numbers on different outgoing links, since it is not certain that one channel number which is utilized for a data packet on an incoming link can also be utilized for the same data packet on all outgoing links.

With previously proposed packet data switches, it has not always been possible to maintain the chronological order between several incoming data packets.

A design with a common control memory for several data links results in that a time multiplex method must be applied. A prerequisite for this is that the control memory must be able to work very rapidly if the selector is to be able to handle high data speeds.

DISCLOSURE OF INVENTION

The object of the present invention is to provide a packet data switch of the kind mentioned in the introduction, which can handle high data speeds and enable an individual data packet to be transferred to several outgoing data links without very rapid control memories and complicated circuits needing to be utilized. In addition, the chronological order between different data packets is ensured. This is achieved by the selector being provided with a separate memory means for each incoming data link and with a separate memory means for each outgoing data link. The memory means associated with the incoming links send control for selective writing-in of a data packet into one or more buffer registers, each associated with an outgoing data link, and the memory means associated with the outgoing links supply new address information to the data packets on the outgoing links.

The characteristics of the invention are apparent from the claims.

BRIEF DESCRIPTION OF DRAWING

The invention will now be described in more detail and with reference to the drawing, on which the FIGURE illustrates an embodiment of a packet data selector in accordance with the invention.

BEST MODE FOR CARRYING OUT THE INVENTION

In the FIGURE there is illustrated an embodiment example of a packet data switch in accordance with the invention. The switch is connected between a plurality of incoming and outgoing data links, of which three of each kind are illustrated in the FIGURE. The incoming data links are denoted 10, 30 and 50 and the outgoing ones 22, 42 and 62. The incoming data links are each connected to first means 11, 31 and 51, which are mutually alike, the means 11 being shown more detailed in the form of a block diagram. The incoming data link 10 is connected to a buffer register 12, into which the incoming data packets are written. When a data packet is written into the register 12 a memory means 13 is addressed with the address information in the address part of the data packet. The memory means suitably consists of a so-called table-look-up memory and the address information of a channel number denoting which of a plurality of different channels the data packet is transmitted on. Information is obtained from the memory means as to the outgoing data link or data links to which the packet is to be transferred. This information is stored, e.g. in a register with a data bit for each outgoing link from the switch, which is illustrated symbolically in the FIGURE. For example, logical ones in the first and third positions of the register and a logical zero in the second position of the register can mean that the data packet shall be transferred to the outgoing data links 22 and 62 but not to the link 42.

The buffer register 12 and corresponding registers in the means 31 and 51 are each connected via a line 14, 34 and 54 to a data bus 70 symbolically denoted in the FIGURE, and which is connected to three mutually alike second means 18, 38 and 58. The means 18 is illustrated in more detail than the others in a block diagram.

A data packet addressed to the outgoing link 22 is written into a buffer register 19 in the means 18. This takes place with the aid of an activating signal on one of three control lines 15, 35 and 55 from the memory means in the means 11, 31 and 51. For example, a data packet is transferred from the incoming link 10 to the outgoing link 22 via the means 18 with the aid of an activating signal in the form of a logical one on the control line 15. In a corresponding way, a data packet is transferred from the link 10 to the outgoing link 42 via the means 38 with the aid of an activating signal on the control line 16, etc. If activating signals occur on several of the control lines 15–17, the data packet is written into several of the means 18, 38 and 58, which enables broadcasting or multicasting in a simple way.

When a data packet is written into the register 19, a memory means 20 is addressed, suitably a so-called table-look-up memory, with the address information in the address part of the data packet and with the number of said first means. This number is transferred from the first means 11 to the second means 18 but is not included in the address of the data packet. New address information replacing the earlier information is then obtained from the memory means 20. In accordance with the illustrated example, this takes place after the data packet had been written into a register 21. However, it is in principle conceivable already to allow this to take place in the register 19, and then do without the register 21. It can be mentioned that the different memory means are updated for each new connection, e.g. with the aid of a supervisory microprocessor not illustrated in the FIGURE.

As will be seen from the above, writing-in of data packets takes place selectively in the means 18, 38 and 58 such that solely the data packets which shall be transferred, for example to the outgoing link 22 are written into the buffer register 19 in the means 18. Relatively small buffer registers can therefore be utilized for each of the outgoing links. The selective writing-in in the buffer register also results in that the memory means 20 and corresponding memories in the means 38 and 58 in the remaining outgoing links can operate comparatively slowly, since the data rate is relatively low in these means. The data rate is also relatively low in the means 11, 31 and 51 at the incoming links 10, 30 and 50, resulting in that the memories in these means can also operate comparatively slowly. There is only high data rate on the lines 14, 34, 54 and 70, which connect the means 10, 30 and 50 at the incoming links to the means 18, 38 and 58 at the outgoing links.

With a selector in accordance with the invention, there is also ensured the chronological order between different data packets, since there are always read out from the buffer register in the means 18, 38 and 58 in the same order as they were read into them.

We claim:

1. A packet data switch for transferring data packets, having an address portion and an information portion, from a plurality of incoming data links to a plurality of outgoing data links, which comprises:
    a plurality of first means, each of which is assigned to an incoming data link, said first means including a buffer register for incoming data packets and a first memory means, each of said first memory means generating control signals; and
    a plurality of second means, each of which is connected to said plurality of first means and is assigned to an outgoing data link, said second means including a second memory means and a buffer register for selectively writing-in incoming data packets in response to the control signals from said first memory means, said second memory means supplying new address information to the incoming data packets which are then provided to the outgoing data links.

2. A packet data switch according to claim 1 wherein said second memory means further includes an additional buffer register in which each data packet is provided with the new address information.

* * * * *